US006875563B2

(12) United States Patent
Orem et al.

(10) Patent No.: US 6,875,563 B2
(45) Date of Patent: Apr. 5, 2005

(54) FLUORINATED SURFACTANTS IN OVERCOAT COMPOSITIONS AND ELEMENTS CONTAINING SAME

(75) Inventors: Michael W. Orem, Rochester, NY (US); Ronald R. Andrews, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/702,861

(22) Filed: Nov. 6, 2003

(65) Prior Publication Data

US 2004/0137385 A1 Jul. 15, 2004

Related U.S. Application Data

(63) Continuation-in-part of application No. 10/156,298, filed on May 28, 2002, now abandoned, which is a continuation-in-part of application No. 09/960,914, filed on Sep. 21, 2001, now abandoned.

(51) Int. Cl.[7] .......................... G03C 1/38; G03C 1/815; G03C 1/85; B01D 12/00; B01F 17/00

(52) U.S. Cl. ....................... 430/512; 430/527; 430/528; 430/529; 430/635; 430/636; 106/154.3; 106/154.4; 106/170.2; 106/170.26; 106/170.46; 106/205.6; 252/500; 516/200; 516/203

(58) Field of Search ................................ 430/512, 527, 430/528, 529, 635, 636; 252/500; 516/200, 203; 106/154.3, 154.4, 170.2, 170.26, 170.46, 205.6

(56) References Cited

U.S. PATENT DOCUMENTS

| | | | | |
|---|---|---|---|---|
| 3,850,640 | A | | 11/1974 | Babbitt et al. |
| 4,242,516 | A | | 12/1980 | Mueller |
| 4,267,087 | A | | 5/1981 | Mueller |
| 4,582,781 | A | | 4/1986 | Chen et al. |
| 5,411,844 | A | | 5/1995 | Orem |
| 5,888,712 | A | | 3/1999 | Lelental et al. |
| 5,955,255 | A | * | 9/1999 | Gerlach et al. |
| 6,232,058 | B1 | | 5/2001 | Adin et al. |
| 6,287,754 | B1 | | 9/2001 | Melpolder et al. |

FOREIGN PATENT DOCUMENTS

| | | |
|---|---|---|
| EP | 0 924 562 A | 6/1999 |
| GB | 1 591 292 A | 6/1981 |

OTHER PUBLICATIONS

US 5,837,440, 11/1998, Gerlach et al. (withdrawn)
Research Disclosure No. 10147, Sep. 1972.

* cited by examiner

*Primary Examiner*—Richard L. Schilling
(74) *Attorney, Agent, or Firm*—Paul A. Leipold

(57) ABSTRACT

A coating composition for use in forming an overcoat layer in a photographic element, said composition comprising an aqueous solution of: a mixture of two or more surfactants; a hydrophilic binder; matte beads; and a lubricating agent; wherein one of the surfactants is represented by the following Formula (I) and is the only fluorosurfactant in the composition:

$$R_f—CH_2CH_2—S\text{-}(A)\text{-}D \quad (I)$$

where $R_f$ is $—(CF_2)_nCF_3$, n represents the number of $CF_2$ groups and is 3 or 5 in at least 60% of the $R_f$ groups present, and in the remainder of $R_f$ groups n is 7, 9, or 11.

A is a divalent linking group that includes substituted alkylene or alkylene (N-alkylene)amide; and D is an ionic group.

A photographic element with an outermost layer containing the coating composition is also disclosed.

28 Claims, No Drawings

FLUORINATED SURFACTANTS IN OVERCOAT COMPOSITIONS AND ELEMENTS CONTAINING SAME

CROSS REFERENCE TO RELATED APPLICATIONS

This application is a continuation-in-part of application Ser. No. 10/156,298 filed May 28, 2002, now abandoned which is a CIP of application Ser. No. 09/960,914, filed Sep. 21, 2001 now abandoned.

FIELD OF THE INVENTION

The invention relates in general to light-sensitive, silver halide photographic elements comprising a support material, one or more image forming layers, and overcoat layers protecting the image forming layers, and in particular to the control of static charging properties of photographic elements containing an improved overcoat layer. More specifically, the present invention relates to improved overcoat compositions and their use in providing protection from the adverse effects of excessive static charging in photographic elements such as photographic papers and films.

BACKGROUND OF THE INVENTION

It is well known that the excessive generation and sparking discharge of electrostatic charges during the manufacture and use of photographic film and paper products are undesirable. Electrostatic charges are generated on the surfaces of overcoat layers or back side layers in these materials by frictional contact with and separation from dissimilar materials such as transport rollers or even the back side layer with respect to the overcoat of the image forming layers, as in a wound stockroll. Excessive accumulation of charge can cause difficulties in handling and transport during manufacturing or in cameras or photofinishing equipment. Sparking discharges of accumulated charge on film or paper surfaces during manufacturing or subsequent handling can cause unwanted exposure marks in the light-sensitive layers.

Although conductive antistatic agents are often incorporated into the back side of film base or paper base to improve electrostatic charging properties of the film or paper products, the use of these antistatic agent in backing layer alone is usually insufficient for preventing all unwanted electrostatic charges from being generated during manufacturing or in transport in cameras or photofinishing equipment. One of the most widely used methods for preventing the excessive generation of electrostatic charges on photographic film and paper products is to add surface active compounds or surfactants which reduce the amount of charge generated on the surface of the outermost protective layer by frictional contact with and separation from dissimilar surfaces as described above. It is also a common practice to add coating aid surfactants to overcoat layers to improve the layer thickness uniformity of the layers, especially in coating methods for the simultaneous application of two or more layers of solution containing gelatin. The polarity of the static charges formed by frictional contact on the surfaces of most gelatin-containing overcoat compositions which also contain hydrocarbon coating aid surfactants, incorporated for improved coating uniformity during the coating process, is a positive polarity. However, when surfactants containing highly fluorinated alkyl groups in their hydrophobic ends are incorporated into overcoat compositions, the resulting static charging of the overcoat surfaces by frictional contact is reduced in its magnitude of positive polarity or becomes closer to neutral or even negative in polarity. The extent of change in charging behavior depends on the amount of fluorinated surfactant used and its molecular structure, which influences its relative effectiveness in negative charging. The composition and amount of the fluorinated surfactant incorporated in the overcoat layer, in combination with the hydrocarbon coating aid surfactants and other addenda, are selected for optimal performance of the product type under conditions of its manufacture and use. When an effective fluorinated surfactant is used at its optimum amount, the electrostatic charging propensity of the overcoat surface is minimized under those conditions of handling and transport during manufacturing and exposure and processing which are most likely to cause unwanted static charge buildup and static marking.

Not all fluorinated surfactants are equally effective in exhibiting this negative charging property when present in overcoat layer compositions containing hydrocarbon coating aid surfactants and other addenda such as dispersed lubricants. The length of the fluorinated carbon chain and the total number of fluorine atoms and their relative positions on the chain, as well as the composition of other groups in the surfactant molecule, are important factors in influencing the negative charging effectiveness of the surfactant. If the surfactant molecule has one or two $-(CF_2)_nF$ or $-(CF_2)_nH$ groups, the minimum number of the value n in for the surfactant molecule to be effective enough in its negative charging property for this application is four if the molecule has one fluorinated group or three if it has two fluorinated groups. If the number of fluorinated carbon atoms in a surfactant molecule with one or two fluorinated carbon chains is too few, the negative charging property is greatly diminished. If the number of fluorinated carbon atoms is too many, the solubility of the surfactant in water solutions is too low to be of practical use.

Babbitt, et al., U.S. Pat. No. 3,850,640, disclosed a combination of surfactants, comprising at least one cationic surfactant and at least one nonionic surfactant, the cationic surfactant having the formula $F-(CF_2)_n-SO_2-N(R_1)-(CH_2)_m-N(R_2R_3R_4)+\ X^-$, and the nonionic surfactant having the structure alkylphenoxy poly(hydroxypropylene oxide), used in coating the outermost layer of a multilayer photographic element, providing improved coatability and better control of static electricity on the resulting coated photographic element. Mixtures of anionic surfactant, nonionic surfactant, and cationic fluorosurfactant are described in Research Disclosure No. 10147 (September 1972), and by Orem, U.S. Pat. No. 5,411,844. Nonionic fluorinated surfactants useful as coating aids and for the control of electrostatic charging in overcoat layers of photographic elements are disclosed in Chen, et al, U.S. Pat. No. 4,582,781. A combination of two surfactants for overcoating both sides of a duplitized black and white X-ray recording material, wherein one of the surfactants is a mixture of $R_f-CH_2CH_2-S-CH(COOH)CHC(=O)HN-CH_2CH_2CH_2N(CH_3)_2$, and $R_f-CH_2CH_2-S-CH(CH_2COOH)C(=O)HN-CH_2CH_2CH_2N(CH_3)_2$ is disclosed by Adin, et al., U.S. Pat. No. 6,232,058. A black and white silver halide motion picture sound recording film overcoated with a layer containing a combination of three surfactants, one of which is S-100.

In the past the most readily available fluorinated surfactants which have been especially effective for adjusting static charging properties of photographic film and paper products have been those with mostly perfluoro-octyl groups. Furthermore, most of them are either perfluoro-octyl sulfonate in their original form or have structures that may degrade to a perfluoro-octyl sulfonate compound. Recent reports indicate perfluoro-octyl sulfonate may accumulate in the blood systems of humans and animals and show toxicity in laboratory animals at high chronic levels of ingestion. Therefore there is interest in identifying alternative surfactants which do not exhibit these characteristics. Fluorinated surfactants that do not break down to perfluoro-octyl sulfonate or accumulate less than perfluoro-octyl sulfonate in the blood system of animals are desired. Telomer-formed compounds with $CF_3(CF_2)_x$—$CH_2$—$CH_2$— groups cannot break down to perfluoro-octyl sulfonate. Quantitative Structure Activity Relationships analyses based on computer software available from SRC (Syracuse Research Corporation) indicate that fluorinated surfactants with telomer-formed fluoroalkyl groups and especially groups which have six or fewer fluorinated carbons (and ethylene groups directed bonded to them) present a lower risk of bioaccumulation.

In addition, fluorinated surfactants used in overcoat layers of photographic elements must have good solubility in the coating solutions of the overcoat layers and provide control of static electric charge, without exhibiting adverse effects on the coating uniformity of the overcoat layer or the underlying image forming layers. An additional requirement is that the surfactants of the protective overcoat layer should not adversely change the photographic performance of underlying image-forming layers.

SUMMARY OF THE INVENTION

The present invention provides an overcoat layer composition for a multilayer photographic imaging element, the overcoat layer exhibiting the favorable electrostatic charging properties required for manufacturing and for handling in exposure and processing equipment. The desirable composition of the invention comprises an ionic-fluoroalkyl surfactant along with one or more hydrocarbon coating aids.

In one aspect, the present invention provides an improvement in the photographic response of the light-sensitive, image-forming layers resulting from the selection of fluoroalkyl surfactants with specific structures for the overcoat layer. In another aspect, the present invention provides a multilayer photographic imaging element with an overcoat layer containing a fluoroalkyl surfactant which presents lower calculated risk factors for environmental health and safety.

The present invention discloses a coating composition for use in forming an overcoat layer in a photographic element, said composition comprising an aqueous solution of:

two or more surfactants;

a hydrophilic binder;

matte beads; and a lubricating agent;

wherein one of the surfactants is represented by the following Formula (I) and is the only fluorosurfactant in the composition:

$$R_f—CH_2CH_2—S\text{-}(A)\text{-}D \qquad (I)$$

where $R_f$ is —$(CF_2)_nCF_3$, n represents the number of $CF_2$ groups and is 3 or 5 in at least 60% of the $R_f$ groups present, and in the remainder of $R_f$ groups n is 7, 9, or 11.

A is a divalent linking group that includes substituted alkylene or alkylene (N-alkylene)amide; and D is an ionic group.

Another aspect of the invention discloses a photographic element comprising:

a) a support, b) at least one image-forming layer; and c) an outermost overcoat layer comprising:

i) two or more surfactants;

ii) a hydrophilic binder;

iii) matte beads; and iv) a lubricating agent;

wherein one of the surfactants is represented by the following Formula (I) and is the only fluorosurfactant in the composition:

$$R_f—CH_2CH_2—S\text{-}(A)\text{-}D \qquad (I)$$

where $R_f$ is —$(CF_2)_nCF_3$, n represents the number of $CF_2$ groups and is 3 or 5 in at least 60% of the $R_f$ groups present, and in the remainder of $R_f$ groups n is 7, 9, or 11.

A is a divalent linking group that includes substituted alkylene or alkylene (N-alkylene)amide; and D is an ionic group.

The present invention differs from Guerlach ’440 in two important aspects. First, Guerlach uses Lodyne S100, a compound that is different from present Formula 1 disclosed herein. Second, Guerlach specifies a composition for black and white imaging whereas the present invention is suitable for color.

In general, UV absorbing dyes are desirable because:

They absorb radiation to which all silver halide emulsions are sensitive, but are invisible to humans.

UV absorbing dyes improve the accuracy of color reproduction.

They absorb radiation from static discharge.

DETAILED DESCRIPTION OF THE INVENTION

The coating composition of the present invention contains at least two surfactants, only one of which is a fluorosurfactant and that flurosurfactant is represented by structure 1, $$R_f—CH_2CH_2—S\text{-}(A)\text{-}D \qquad (I),$$

where $R_f$ is $(CF_2)_nCF_3$, where n represents the number of $CF_2$ groups and is 3 or 5 in at least 40% of the $R_f$ groups present, the remainder of $R_f$ groups being 7, 9, or 11; A is a divalent linking group that includes substituted alkylene or alkylene (N-alkylene)amide; and D is an ionic group, in combination with a hydrophilic binder, matte beads, and a lubricating agent.

D can be $SO_3$ M or —$NR_1R_2R_3$ X, where $R_1$, $R_2$, and $R_3$ are independently selected from alkyl or substituted alkyl groups, M is a monovalent ion such as potassium or sodium and X is a halide ion such as chlorine. Examples of the formula of compound I are FC-2 $R_f—CH_2CH_2—SCH_2CH(OH)CH_2NMe_3^+$ FC-3 $R_f—CH_2CH_2—S—CH_2CH_2C(=O)NH—C(CH_3)_2CH_2SO_3—Na+$ It is understood that the invention is not limited to the structures given in these examples. The synthetic process produces a mixture of compounds. It is preferred that n representing the number of $CF_2$ groups be 3 or 5 in at least 60% of the $R_f$ groups present, and in the remainder of $R_f$ groups n is 7, 9, or 11 . . . ; and most preferred that n be 3 or 5 in at least 90% of the $R_f$ groups, and in the remainder of $R_f$ groups n is 7.

The other surfactant not represented by Formula I, may be selected from the group consisting of nonionic alkylphenoxy polyether compounds.

The element of the invention contains an overcoat layer containing the compound according to Formula I in a laydown of 1 to 25 milligrams per square meter and preferably 2 to 15 milligrams per square meter. The coating vehicle useful with this invention can contain various colloids alone or in combination. Suitable hydrophilic materials include both naturally occurring substances such as proteins, protein derivatives, cellulose derivatives—e.g., cellulose esters, gelatin—e.g., alkali-treated gelatin (cattle bone or hide gelatin) or acid-treated gelatin, gelatin derivatives—e.g., acetylated gelatin, phthalated gelatin and the like, polysaccharides such as dextran, gum arabic, zein, casein, pectin, collagen derivatives, collodion, agar-agar, arrowroot, albumin and the like.

Photographic emulsion layers and other layers of photographic elements of the present invention such as overcoat layers, interlayers and subbing layers, as well as receiving layers in image-transfer elements, can also contain alone or in combination with hydrophilic water-permeable colloids as vehicles or vehicle extenders (e.g., in the form of latices), synthetic polymeric peptizers, carriers and/or binders such as poly(vinyl lactams), acrylamide polymers, polyvinyl alcohol and its derivatives, polyvinyl acetals, polymers of alkyl and sulfoalkyl acrylates and methacrylates, hydrolyzed polyvinyl acetates, polyamides, polyvinyl pyridine, acrylic acid polymers, maleic anhydride copolymers, polyalkylene oxides, methacrylamide copolymers, polyvinyl oxazolidinones, maleic acid copolymers, vinylamine copolymers, methacrylic acid copolymers, acryloyloxyalkyl sulfonic acid copolymers, sulfoalkyl acrylamide copolymers, polyalkyleneimine copolymers, polyamines, N,N-dialkylaminoalkyl acrylates, vinyl imidazole copolymers, vinyl sulfide copolymers, halogenated styrene polymers, amineacrylamide polymers, polypeptides, compounds containing semicarbazone or alkoxy carbonyl hydrazone groups, polyester latex compositions, polystyryl amine polymers, vinyl benzoate polymers, carboxylic acid amide latices, copolymers containing acrylamidophenol cross-linking sites, vinyl pyrrolidone, colloidal silica and the like as described on pages 600–601 in *Research Disclosure*, Item 38957 (Photographic Silver Halide Emulsions, Preparations, Addenda, Systems, and Processing), September 1996, published by Kenneth Mason Publications, Ltd., Dudley Annex, 12A North Street, Emsworth, Hampshire, PO10 7DQ, ENGLAND, the disclosures of which are incorporated by reference. This publication will be identified hereafter by the term, "*Research Disclosure*".

Gelatin and gelatin derivative containing layers of the photographic elements of the invention can be protected against by biological degradation by the addition of agents for arresting biological activity (biocides and/or biostats), such as illustrated by Kato et al U.S. Pat. No. 4,923,790, Sasaki et al U.S. Pat. No. 4,997,752, Miyata et al U.S. Pat. No. 5,185,240, Noguchi et al U.S. Pat. No. 5,198,329, Wada EPO 0 331 319, and Ogawa et al EPO 0 429 240.

The layers of the photographic element of this invention containing cross-linkable colloids, particularly the gelatin-containing layers, can be hardened by various organic and inorganic hardeners such as those described in T. H. James, *The Theory of the Photographic Process,* 4th Ed., MacMillan, 1977, pp. 77–87. The hardeners can be used alone or in combination and in free or in blocked form.

The photographic element layers of this invention can contain various types of ionic coating aid surfactants, such as anionic, cationic, nonionic or zwitterionic surfactants, alone or in combination. Some useful coating aids are sulfonated alkylaryl polyethers as illustrated by Baldsiefen U.S. Pat. No. 2,600,831, Knox et al U.S. Pat. Nos. 2,719,087 and 3,026,202, Sakamoto et al U.S. Pat. No. 4,192,683 and Nishio et al U.S. Pat. No. 3,415,649; alkylene glycol ethers of polyhydric alcohols as disclosed by Swan et al U.S. Pat. No. 2,240,469, Swan U.S. Pat. No. 2,240,472, Knox et al U.S. Pat. No. 2,831,766, Seidel et al U.S. Pat. No. 3,409,435, Eiseman et al U.S. Pat. No. 3,442,654, Knox U.S. Pat. No. 3,514,293, Padday U.S. Pat. No. 3,516,844, Gantz et al U.S. Pat. No. 3,617,292, Wagner et al U.K. Patent 774,806, U.K. Patent 1,022,878 and Milton U.K. Patent 1,201,054; amphoteric compounds as described in McQueen U.S. Pat. No. 2,197,809, Chilton U.S. Pat. No. 2,368,287, Gates U.S. Pat. No. 2,824,015, Swan U.S. Pat. No. 2,240,471, Knox et al U.S. Pat. Nos. 2,992,108, 3,091,623, 3,169,870 and 3,306,749, Harriman U.S. Pat. No. 3,018,178, Ben-Ezra U.S. Pat. No. 3,133,816, Wolf et al U.S. Pat. No. 3,408,193, Nishio et al U.S. Pat. Nos. 3,441,413 and 3,545,974, Sato et al U.S. Pat. No. 3,475,174, Knox U.S. Pat. No. 3,506,449, Gantz et al U.S. Pat. No. 3,563,756, Kalenda U.S. Pat. No. 3,573,049, Mackey U.S. Pat. No. 3,619,199, Yamamoto et al U.S. Pat. Nos. 3,726,683 and 3,843,368; carboxyalkyl-substituted polyglycol ethers and esters as described in Ville et al U.S. Pat. No. 3,663,229; various types of monoesters derived from polyhydroxy compounds as disclosed in Boomer U.S. Pat. No. 2,190,645, Swan U.S. Pat. No. 2,240,470, Simmons U.S. Pat. No. 2,240,475, Swan et al U.S. Pat. No. 2,353,279, Knox et al U.S. Pat. No. 3,220,847, Hagge et al U.S. Pat. No. 3,516,833 and U.K. Patent 1,012,495; fluoro-substituted compounds as illustrated by McDowell U.S. Pat. No. 3,589,906, Groh et al U.S. Pat. No. 3,666,478, Babbitt et al U.S. Pat. No. 3,775,126, Bailey et al U.S. Pat. No. 3,850,642, Habu et al German OLS 2,610,485, U.K. Patent 1,439,402, and Cruikshank et al, *Research Disclosure*, Vol. 166, February, 1978, Item 16630; imidazoles as illustrated by Mackey U.S. Pat. No. 2,982,651 and Knox U.S. Pat. No. 3,539,352; maleopimarates, optionally in combination with an acetylenic ethylene oxide derivative or a sucrose ester of an aliphatic acid, as disclosed in Knox et al U.S. Pat. No. 2,823,123, Wilson et al U.S. Pat. No. 3,041,171 and Knox U.S. Pat. Nos. 3,437,485 and 3,564,576; maleic ester amides as illustrated in Kamio U.S. Pat. No. 4,547,459; the sodium salt of the condensation product of naphthalene sulfonic acid and formaldehyde as illustrated in Salminen et al U.S. Pat. No. 3,062,649; phosphate esters of glycidol polyethers as disclosed in Mackey U.S. Pat. No. 3,725,079; long-chain sucrose ethers or urethanes as illustrated by Nishio et al U.S. Pat. No. 3,507,660; higher alcohol sulfates, water-soluble (sulfo) salts of the aliphatic esters of sulfosuccinic acid, fatty acid esters of hydroxyalkyl sulfonic acid, amide and ester derivatives of sulfoacetic acid, alpha-sulfo lower alkyl esters of 7 to 18 carbon atom fatty acids and sulfate ester products of a glycidol polyether as described in Baldsiefen U.S. Pat. No. 2,203,768, Simmons et al U.S. Pat. No. 2,240,476, Harsh et al U.S. Pat. No. 2,447,462, Knox et al U.S. Pat. Nos. 3,068,101 and 3,201,252, Mackey et al U.S. Pat. No. 3,516,835, Mackey U.S. Pat. No. 3,725,080, Pollet et al U.S. Pat. No. 3,793,032, Ishihara et al U.S. Pat. No. 3,824,102 and *Research Disclosure*, Vol. 160, August, 1977, Item 16040; sulfoxides as described by Herz, *Research Disclosure*, Vol. 129, September, 1975, Item 12927; combinations of alkyl sulfate surfactants and N-acyl sarcosinate surfactants as disclosed in Cruikshank et al U.S. Pat. No. 4,370,412; taurines as disclosed by Knox et al U.S. Pat. Nos. 2,739,891 and 3,165,409 and Ben-Ezra U.S. Pat. No. 3,042,522.

Relatively recent ionic coating aids, surfactants and dispersing agents useful in the invention, including anionic, nonionic and cationic materials, are described in Furlan et al U.S. Pat. No. 5,037,729, Cavallo et al U.S. Pat. No. 5,098,821, Ashida et al U.S. Pat. No. 5,008,150, Toya (et al) U.S. Pat. Nos. 4,916,049 and 4,920,032, Yoneyama et al U.S. Pat. No. 4,916,054, Pitt et al U.S. Pat. Nos. 4,968,599 and 4,988,610 and WO 91/18321, Briggs et al U.S. Pat. No. 4,892,806, Ishigaki U.S. Pat. No. 5,208,139, Yoneyama et al U.S. Pat. No. 5,221,603, Uesawa et al U.S. Pat. No. 4,762,776, Orem U.S. Pat. No. 5,411,844, Fujita et al U.S. Pat. No. 5,415,986, Orem U.S. Pat. No. 5,418,128, Endres et al German OLS 3,835,077, Mochizuki et al EPO 0 556 002, Fukazawa et al EPO 0 306 246, Takada et al EPO 0 567 083, Tachibana et al EPO 0 361 138, Orem EPO 0 549 496, Ueda et al EPO 0 643 327 and Vandenabeele EPO 0 644 455.

For purposes of the present invention, preferred coating aid surfactants include, but are not limited to, alkyl or alkyl aryl sulfonates, alkyl aryl polyether sulfates or sulfonates, and alkyl sulfosuccinate esters. The ratio of fluorinated surfactant to coating aid surfactant is preferably 1:15 to 1:2 by weight.

The flexibility of the silver halide emulsion and other hydrophilic colloid-containing layers of the photographic elements of the invention upon drying can be improved through the incorporation of plasticizers. Representative plasticizers include alcohols, dihydric alcohols, trihydric alcohols and polyhydric alcohols, acid amides, cellulose derivatives, lipophilic couplers, esters, phosphate esters such as tricresyl phosphate, glycol esters, diethylene glycol mixed esters, phthalate esters such as dibutyl phthalate and butyl stearate, tetraethylene glycol dimethyl ether, ethyl acetate copolymers, lactams, lower alkyl esters of ethylene bis-glycolic acid, ether esters or diesters of an alkylene glycol or a polyalkylene glycol, polyacrylic acid esters, polyethylene imines, poly(vinyl acetate) and polyurethanes, as illustrated by Eastman et al U.S. Pat. No. 306,470, Wiest U.S. Pat. No. 3,635,853, Milton et al U.S. Pat. No. 2,960,404, Faber et al U.S. Pat. No. 3,412,159, Ishihara et al U.S. Pat. No. 3,640,721, Illingsworth et al U.S. Pat. No. 3,003,878, Lowe et al U.S. Pat. No. 2,327,808, Umberger U.S. Pat. No. 3,361,565, Gray U.S. Pat. No. 2,865,792, Milton U.S. Pat. Nos. 2,904,434 and 2,860,980, Milton et al U.S. Pat. No. 3,033,680, Dersch et al U.S. Pat. No. 3,173,790, Fowler U.S. Pat. No. 2,772,166 and Fowler et al U.S. Pat. No. 2,835,582, VanPaesschen et al U.S. Pat. No. 3,397,988, Balle et al U.S. Pat. No. 3,791,857, Jones et al U.S. Pat. No. 2,759,821, Ream et al U.S. Pat. No. 3,287,289 and DeWinter et al U.S. Pat. No. 4,245,036.

The photographic elements of the present invention can contain lubricants to reduce sliding friction encountered in use. Representative lubricants which can be used in photographic elements include long-chain fatty acids, alkali salts of sulfonated castor oil, alkaline earth metal salts of higher aliphatic carboxylic acids, monohydric and dihydric alcohols, ethers, primary amides, hydroxyalkyl amine fatty acid condensates, esters, polyesters, sperm-oil products, polysaccharide derivatives, polytetrafluoroethylene particles, colloidal silica, silicone derivatives, polymeric silicone compounds plus ö-alanine-derivative surfactants, mixtures of an alkyl silicone and an aryl silicone, phosphate triesters, alkali metal salts of alkylphosphoric acid esters, poly(methyl methacrylate) beads, betaines, acyl alkyl taurines and paraffins and waxes such as carnauba wax, as illustrated by Guestaux et al U.S. Pat. Nos. 3,082,087 and 3,658,573, Robijns U.S. Pat. No. 2,588,765, Nellist et al U.K. Patent 1,263,722, Harriman U.S. Pat. No. 3,018,178, Brown et al U.K. Patents 1,320,564 and 1,320,757, Duane U.S. Pat. No. 3,121,060, DeBoer et al, *Research Disclosure*, Vol. 139, November, 1975, Item 13969, Mackey et al U.S. Pat. No. 3,870,521, Stephens U.S. Pat. No. 3,679,411, McGraw U.S. Pat. No. 3,489,567, Ben-Ezra U.S. Pat. No. 3,042,522, U.K. Patent 955,061, Tallet et al U.S. Pat. No. 3,080,317, Earhart et al U.S. Pat. No. 3,516,832, Knox et al U.S. Pat. No. 2,739,891, Secrist et al U.S. Pat. No. 3,295,979, Nadeau et al U.S. Pat. No. 3,222,178 and Guestaux French Patent 2,180,465, Shibue et al U.K. Patent Application 2,027,221, Naoi et al U.S. Pat. No. 4,232,117, Sugimoto et al U.S. Pat. No. 4,675,278, Yoneyama et al U.S. Pat. No. 5,063,147, Takeuchi U.S. Pat. No. 5,019,491 Shiba et al U.S. Pat. No. 4,866,469, Geiger et al U.S. Pat. No. 5,288,602 and Miyamoto EPO 0 668 534.

The layers of the photographic elements of the invention can contain matting agents for such purposes as prevention of blocking and ferrotyping, reduction of static charging and excessive sheen, physical durability, pencil acceptance, improved air release during vacuum drawdown and avoidance of Newton's rings. In the present photographic element, it is preferred that there be at least two types of matte beads. For example, one type of matte beads may be a copolymer of methylmethacrylate and methacrylic acid and another type may be a polymer of methylmethacrylate.

Finely divided inorganic particles such as various forms of silica, barium and calcium sulfates, zinc and titanium oxides, desensitized silver halide and zinc carbonate, dispersed in natural and synthetic vehicles, can be employed as illustrated by Robijns U.S. Pat. No. 2,192,241, Maynard et al U.K. Patent 1,201,905, deHaes U.S. Pat. No. 3,257,206 Nadeau U.S. Pat. No. 3,437,484 Himmelmann et al U.S. Pat. No. 3,322,555, Whitmore et al U.S. Pat. No. 3,411,907, Moede U.S. Pat. No. 3,353,958, Hasenauer et al U.S. Pat. No. 3,370,951, Takenaka et al U.S. Pat. No. 3,615,554, U.K. Patent 1,260,772, Oshibuchi et al U.S. Pat. No. 3,635,714, Verburg U.S. Pat. No. 3,769,020, Secrist et al U.S. Pat. No. 4,029,504, Nagatomo et al U.S. Pat. No. 4,021,245 and German OLS 2,529,321, Yutzy et al U.K. Patent 760,775, Byerley et al U.S. Pat. No. 3,523,022 and Salminen et al U.S. Pat. No. 3,062,649.

Finely divided organic particles or beads can be similarly used in the invention as matting agents, such as calcium organic salts, starches—including starch esters, flours, arrowroot, india rubber, talc, hardened deionized or deashed gelatin, zein and polymeric materials—including various forms of cellulose and polymers or copolymers of $\alpha,\beta$-ethylenically unsaturated mono- and di-carboxylic acids, esters and half-esters and their sulfonic acid analogues (particularly acrylic and methacrylic acids and their methyl esters), styrene, acrylonitrile and fluorinated ethylenes, as well as polycarbonate and poly(vinyl alcohol), as illustrated by Jelley U.S. Pat. No. 1,939,213, Knoefel U.S. Pat. Nos. 2,221,873 and 2,268,662, Lindquist U.S. Pat. No. 2,322,037, Plakunov U.S. Pat. No. 3,591,379, Potter et al U.S. Pat. No. 2,376,005, Jelley et al U.S. Pat. No. 2,992,101, Minsk et al U.S. Pat. No. 2,391,181, Lynn U.S. Pat. No. 2,701,245, Earhart et al U.S. Pat. No. 3,516,832, Morcher et al U.S. Pat. No. 3,079,257, Grabhoefer et al U.S. Pat. No. 3,443,946, Klockgether et al U.S. Pat. No. 3,262,782, U.K. Patent 1,055,713, De Geest et al U.S. Pat. No. 3,754,924 and Hutton U.S. Pat. No. 3,767,448. Copolymers of methylmethacrylate and methacrylic acid are preferred. Vinyl chloride polymers or copolymers can be used as illustrated by Roth et al U.K. Patent 2,033,596, copolymers of fluorinated monomers and silicon-containing monomers as described in Japanese Patent Application JA 62/17744, and copolymers of maleic anhydride and olefins as illustrated by Brück et al U.S. Pat. No. 4,287,299. The matte can consist of inorganic particles coated with an organic polymer as illustrated by Thijs et al U.S. Pat. No. 4,235,959, of layered polymer particles, as illustrated in Japanese Patent Application JA 62/17742, or polymers coated with fluorine compounds, as illustrated in Japanese Patent Application JA 61/230136. The particle surfaces can be linked to gelatin, as illustrated by Bagchi et al EPO 0 307 855.

The matte particles may be of a range of sizes and of various shapes, for example, irregular as in the case of silica particles or spherical as in the case of many organic polymer mattes. The particles can be monodisperse as illustrated in *Research Disclosure*, Vol. 216, April, 1982, Item 21617. The particles may have a bimodal size distribution, as disclosed in U.S. Pat. Nos. 5,550,011 and 5,595,862. The particles can be porous, as illustrated by Naito, U.S. Pat. No. 4,094,848. The matte particles can be pigmented or dyed, as illustrated by Heigold et al U.S. Pat. No. 4,172,731. The particles can be process-soluble, as illustrated by Jelley et al U.S. Pat. No. 2,992,101, Hutton U.S. Pat. No. 3,767,448, Naito U.S. Pat. No. 4,094,848, Vallarino et al U.S. Pat. No. 4,447,525, Himmelmann et al U.S. Pat. No. 4,524,131 and Japanese Patent Applications 62/14467 and 61/230136. The matte can be resistant to removal in the process, as illustrated by Ishii U.S. Pat. No. 4,396,706. The particles can be alkali-swellable but not removable, as illustrated by Brück et al U.S. Pat. No. 4,301,240. Combinations of process-insoluble and process-soluble matting agents can be used.

Relatively recently published examples of matting agents useful in the invention are provided by Podszun et al U.S. Pat. No. 5,093,445, Fautz U.S. Pat. No. 4,980,273, Vandenabeele et al U.S. Pat. No. 4,766,059, Grzeskowiak et al U.S. Pat. No. 4,711,838, Lalvani et al U.S. Pat. No. 4,940,653, Katoh et al U.S. Pat. No. 4,952,484, Okamura et al U.S. Pat. No. 5,057,407, Ogasawara et al U.S. Pat. No. 5,204,233, Ishigaki et al U.S. Pat. No. 5,206,127, Nitschke et al U.S. Pat. No. 4,997,735, Ishigaki U.S. Pat. No. 5,122,445, Arai et al U.S. Pat. No. 5,070,005, Nishio et al U.S. Pat. No. 5,252,448, Elton et al U.S. Pat. No. 5,104,914, Takada U.S. Pat. No. 5,352,569, Tashiro et al U.S. Pat. No. 5,370,982, Smith et al U.S. Pat. No. 5,378,577, Yamashita et al U.S. Pat. No. 5,380,637, Waterman U.S. Pat. No. 5,415,969, Jury U.S. Pat. No. 5,420,006, Formasari et al U.S. Pat. No. 5,441,860, Kanetake et al EPO 0 567 118, Baldassarri et al EPO 0 479 029, Besio et al EPO 0 370 405, Haga et al EPO 0 350 022, Harris EPO 0 341 200, Shor EPO 0 282 171, Lalvani et al EPO 0 262 504 and Bagchi EPO 0 307 855.

Matte particles surrounded by colloidal inorganic particles are disclosed in Sterman et al U.S. Pat. No. 5,288,598, Sterman et al U.S. Pat. No. 5,300,411. Matte particles reacted in the presence of gelatin are illustrated in Smith, et al., U.S. Pat. No. 5,563,226. Improved scratch resistance, in particular when a photographic material is stored in a thrust cartridge, is disclosed in Smith, Wang, et al., U.S. Pat. Nos. 5,536,627, 5,738,983, 5,935,742, 5,770,353, 5,766,836, 5,858,634, 5,866,312, and 5,965,339.

The photographic element of the present invention may contain non-imaging layers (interlayers) that may be employed for a variety of purposes, including providing a reduction of the interaction of imaging layers by providing physical separation or by containing a scavenging compound. The interlayer may contain materials, for example, fine-grained, unsensitized silver halide, to adsorb inhibitors released from the film during processing or seasoned into the developer solution.

Non-imaging layers (interlayers) may be employed in the photographic element of the invention to control the propagation of actinic radiation within the element, for example by providing selective filtration of light to prevent certain wavelengths from entering underlying layers, to improve sharpness of the image by absorbing scattered light, and to prevent static marking by absorbing ultraviolet light from static discharges. Ultraviolet absorbing dyes for use in photographic elements include those described by Besio et al U.S. Pat. No. 4,849,326 (cyano substituted butamines), Logan U.S. Pat. No. 4,839,274 (acetylenic compounds, Pruett et al U.S. Pat. No. 5,215,876 (substituted styrenes), the hydroxyphenyl benzotriazoles of Nishijima et al EPO 0 451 813, Schofield et al EPO 0 190 003, and Umemoto U.S. Pat. No. 5,084,375 and Leppard et al EPO 0 531 258 (triazines).

Photographic elements of the invention employ silver halide emulsion grains as the light sensitive material in the imaging layers. The composition of the grains may be any combination of silver with the halides, chloride, bromide, and iodide, as described in *Research Disclosure*, Item 38957. As disclosed in *Research Disclosure* Item 38957 (pages 592–598), the grain morphology may be tabular or non-tabular; the crystal faces may be parallel to the (100) or (111) crystallographic planes of the face-centered cubic crystal lattice; the size distribution may be polydisperse, uniform, or bimodal; the internal structure of the halide composition may be uniform or may vary continuously or abruptly; composite grains may be formed by epitaxial deposition; and the grains may be modified by halide conversion. Precipitation procedures are illustrated in *Research Disclosure*, Item 38957. Silver halide grains may be modified by introduction of reducing agents or the inclusion of dopants as described in *Research Disclosure*, Item 38957. Useful dopants and combinations of dopants are also described Johnson, et al., U.S. Pat. No. 5,164,292, and in Olm, et al., U.S. Pat. No. 5,360,712.

The silver halide to be used in the invention may be advantageously subjected to chemical sensitization. Compounds and techniques useful for chemical sensitization of silver halide are known in the art and described in *Research Disclosure*, Item 38957 and the references cited therein. Compounds useful as chemical sensitizers, include, for example, active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 4 to 8, and temperatures of from 30 to 80° C., as described in *Research Disclosure*, Item 38957, Section IV (pages 601–603) and the references cited therein. Particularly effective chemical sensitizers include the gold compounds disclosed in the references on page 602 of *Research Disclosure*, Item 38957 in combination with the sulfur sensitizers disclosed in the references on page 603 of *Research Disclosure*, Item 38957. Examples of especially useful chemical sensitization are disclosed in U.S. Pat. No. 4,810,626, U.S. Pat. No. 6,034,249, U.S. Pat. No. 5,945,270, U.S. Pat. No. 5,049,485, U.S. Pat. No. 5,049,484, and U.S. Pat. No. 5,220,030.

The emulsions useful in the invention may be spectrally sensitized using the compounds and methods described in *Research Disclosure*, Item 38957 (pages 603–608). Photographic elements, typically using one or more sensitizing dyes, having particular relationships of sensitivities at specified wavelength or wavelength ranges, are described in the references cited by *Research Disclosure*, Item 38957.

The addition of compounds useful in the invention as finish modifiers, supersensitizers, antifoggants, and stabilizers, is illustrated in *Research Disclosure*, Item 38957 (pages 606–610). Speed increasing compounds may be added to the emulsions as disclosed in Farid et al, U.S. Pat. Nos. 5,747,235, 6,010,841, 5,747,235, 6,153,371, 5,994,051, 6,054,260, and by Allway, et al., in EPA 1016 902.

The photographic elements of the invention can be color photographic elements that form dye images through the selective destruction, formation or physical removal of dyes. The photographic elements can produce dye images through the selective formation of dyes such as by reacting (coupling) a color-developing agent (e.g., a primary aromatic amine) in its oxidized form with a dye-forming coupler. In one form, the dye-forming couplers are chosen to form subtractive primary (i.e., yellow, magenta and cyan) image dyes and are nondiffusible, colorless couplers, such as 2- and 4-equivalent couplers of the open-chain ketomethylene, pyrazolone, pyrazolotriazole, pyrazolobenzimidazole, phenol and naphthol type, hydrophobically ballasted for incorporation in high-boiling organic (coupler) solvents. Such compounds and elements are disclosed in the references cited in *Research Disclosure*, Item 38957 (pages 616–624). The photographic element may also incorporate alkali-soluble ballasted couplers.

The photographic elements of the present invention, in addition to comprising dye-forming couplers, can comprise image-modifying couplers or compounds. Such image-modifying couplers or compounds can contribute to dye density and can release, either directly or through one or more timing or linking groups, photographically useful fragments such as development accelerators (often referred to as fogging agents), development inhibitors, bleach accelerators, bleach inhibitors, developing agents (e.g. competing developing agents or auxiliary developing agents), silver complexing agents, fixing agents, toners, hardeners, tanning agents, antistain agents, stabilizers, antifoggants, competing couplers, and chemical or spectral sensitizers and desensitizers. Release of the photographically useful fragments typically occurs upon reaction of the coupler or compound with oxidized developer; although it may also occur by other means, such as upon exposure to nucleophiles present in processing baths. Useful image-modifying compounds and photographic elements containing them are described in *Research Disclosure*, Item 38957 (pages 618–621). The photographic elements can incorporate color dye-forming couplers as described on page 624 of *Research Disclosure*, Item 38957. Image dye stabilizers and dye-hue-modifying compounds are described in *Research Disclosure*, Item 38957 (pages 621–623).

The photographic elements of the invention can have photographic silver halide emulsion layers and other layers such as intermediate layers, barrier layers, scavenger layers, filter layers, antihalation layers, overcoat layers and subbing layers, in any order known to be useful in the photographic art. Such arrangements are described in *Research Disclosure*, Item 38957 (pages 624–627). A variety of supports are suitable for use in photographic elements of the invention. Typical photographic supports include polymeric film, wood fiber—e.g., paper, metallic sheet and foil, glass and ceramic supporting elements provided with one or more subbing layers. Typical of useful polymeric film supports are films of cellulose nitrate and cellulose esters (such as cellulose triacetate and diacetate), polystyrene, polyamides, homo- and copolymers of vinyl chloride, poly(vinyl acetal), polycarbonate, homo-and copolymers of olefins such as polyethylene and polypropylene, and polyesters of dibasic aromatic carboxylic acids with divalent alcohols such as poly(ethylene terephthalate) and poly(ethylene naphthalate). Cellulose acetate photographic film supports, methods of making, and applications thereof are set forth in Rieth U.S.

Pat. No. 4,992,491, Suzuki et al U.S. Pat. No. 5,188,788, Machell et al U.S. Pat. No. 5,219,510, Nishiura et al EPO 0 479 260 and Tsujimoto et al EPO 0 535 652.

Preferred cellulose ester supports are cellulose triacetate supports, as illustrated by Fordyce et al U.S. Pat. Nos. 2,492,977, '978 and 2,739,069, as well as mixed cellulose ester supports, such as cellulose acetate propionate and cellulose acetate butyrate as illustrated by Fordyce et al U.S. Pat. No. 2,739,070. Cellulose ester films can be formed by varied techniques, as illustrated by Malm et al U.S. Pat. No. 3,592,671, Dotson et al U.S. Pat. No. 3,608,059, Tuoey et al U.S. Pat. No. 3,640,742, Dotson et al U.S. Pat. No. 3,705,148, Schrader U.S. Pat. No. 3,718,728 and Dresie et al U.S. Pat. No. 3,793,043, and can be modified for use as photographic film supports as illustrated by Grady et al U.S. Pat. No. 3,376,149, Jacoby et al U.S. Pat. No. 3,627,583 and Novak et al U.S. Pat. No. 4,092,173. Incorporation of stripping aids in cellulose ester supports is described in Krall U.S. Pat. No. 4,348,238.

Preferred polyester film supports are comprised of linear polyester, such as illustrated by Alles et al U.S. Pat. No. 2,627,088, Wellman U.S. Pat. No. 2,720,503, Alles U.S. Pat. No. 2,779,684 and Kibler et al U.S. Pat. No. 2,901,466. Polyester films can be formed by varied techniques as illustrated by Alles, cited above, Czerkas et al U.S. Pat. No. 3,663,683 and Williams et al U.S. Pat. No. 3,504,075, and can be modified for use as photographic film supports by subbing, etc., as illustrated by VanStappen U.S. Pat. No. 3,227,576, Nadeau et al U.S. Pat. Nos. 3,143,421 and 3,501,301, Reedy et al U.S. Pat. No. 3,589,905, Babbitt et al U.S. Pat. No. 3,850,640, Bailey et al U.S. Pat. No. 3,888,678, Hunter U.S. Pat. No. 3,904,420, Mallinson et al U.S. Pat. No. 3,928,697, Van Paesschen et al U.S. Pat. No. 4,132,552, Schrader et al U.S. Pat. No. 4,141,735, McGrail et al U.S. Pat. No. 4,304,85 1, Kreil et al U.S. Pat. No. 4,594,262, and Bayless et al U.S. Pat. No. 4,645,73 1. The polyester film support can be discharge-treated and subbed with a polymer-gelatin composition cross-linkable with a gelatin hardener, as illustrated by Ponticello et al, U.S. Pat. Nos. 4,689,359 and 4,695,532. Polyester supports and related features are further illustrated by the following recent publications: Maier et al U.S. Pat. Nos. 5,034,263 and 4,994,312, Fukazawa U.S. Pat. No. 5,225,319, Kawamoto et al U.S. Pat. No. 4,978,740, Van Cappellen et al U.S. Pat. No. 4,892,689, Hiraoka et al U.S. Pat. No. 5,215,825, Nitta et al U.S. Pat. No. 5,188,774, Verheijen et al U.S. Pat. No. 5,185,426, Stevens et al U.S. Pat. No. 4,994,214, Satako et al U.S. Pat. No. 4,910,235, Brozek et al U.S. Pat. No. 5,138,024, Kiyohara et al U.S. Pat. Nos. 4,898,897 and 4,847,149 and EPO 0 327 768, Greener et al U.S. Pat. No. 5,288,601, Kawamoto U.S. Pat. No. 5,294,473, Sumner, Jr. et al U.S. Pat. No. 5,296,587, Jones et al U.S. Pat. No. 5,310,857, Kawamoto U.S. Pat. Nos. 5,350,829 and 5,368,997, Kobayashi et al U.S. Pat. No. 5,372,925, Tsou et al U.S. Pat. No. 5,385,704, Yajima et al U.S. Pat. No. 5,387,501, Marien et al U.S. Pat. No. 5,411,843, Grace et al U.S. Pat. No. 5,425,980, Satake et al EPO 0 334 367, Nishiura et al EPO 0 496 346, Sakamoto et al EPO 0 510 654, Mochizuki et al EPO 0 517 506, Ueda et al EPO 0 518 260, Kobayashi et al EPO 0 545 439, EPO 0566 094 and 0 572 275, Yajima et al EPO 0 568 268, Ueda et al EPO 0 562 533, Mostaert et al EPO 0 559 244, Araki et al EPO 0 568 268, Stevens et al EPO 0 582 750, Murayama EPO 0 583 787, Verheyen EPO 0 606 663, Nakanishi et al EPO 0 618 488, Kimura et al EPO 0 619 516, Okamoto et al EPO 0 636 928, Kawamoto et al EPO 0 658 804, Kawamoto et al EPO 0 674 218, Hashimoto et al EPO 0 677 778, Yajima et al EPO 0 681 211, Bennett et al WO 94/13480, and in Tetsuro et al German OLS 3,800,130.

The side of the support opposite the coated photosensitive layers is coated with a layer providing electrical conductivity. Compounds effective with the present invention include inorganic salts and electrically conductive polymers, preferably quaternary ammonium acrylic copolymers coated in a suitable binder.

The layers of the photographic element of this invention may be coated on the support by a variety of methods known in the art. Preferred methods are bead coating and curtain coating. Bead coating is disclosed in Beguin, U.S. Pat. No. 2,681,294, Mercier et al., U.S. Pat. No. 2,761,419, and Russell, U.S. Pat. No. 2,761,791. More preferred is the method of curtain coating disclosed in U.S. Pat. No. 3,508, 947, incorporated herein by reference. This and subsequent patents relating to curtain coating (e.g., U.S. Pat. No. 3,632, 374 and U.S. Pat. No. 4,287,240) describe the use of a coating hopper to form a free-falling curtain of liquid photographic coating composition which impinges transversely across a moving web of film or paper and forms a coated layer thereon. Improved methods of coating are described in Blake, U.S. Pat. No. 5,391,401, Finnicum, et al, U.S. Pat. No. 5,206,057, Conroy, et al, U.S. Pat. No. 5,338,359, Conroy, et al, U.S. Pat. No. 5,358,569, Conroy, et al, U.S. Pat. No. 5,382,292, Ruschak, et al, U.S. Pat. No. 5,395,660, Baumlin, et al, U.S. Pat. No. 5,462,598, Devine, et al, U.S. Pat. No. 5,569,492, Clarke, U.S. Pat. No. 5,609, 923, Baumlin, U.S. Pat. No. 5,725,666, Devine, et al, U.S. Pat. No. 5,725,910, Devine, et al, U.S. Pat. No. 5,763,013, Ruschak, et al, U.S. Pat. No. 5,885,660, Devine, et al, U.S. Pat. No. 5,976,251, Korokeyi, et al, U.S. Pat. No. 5,976,630, Clarke, et al, U.S. Pat. No. 6,099,913, Clarke, et al, U.S. Pat. No. 6,103,313, and Ruschak, et al, U.S. Pat. No. 6,117,236.

The element of the present invention may be a color negative film suitable for still camera or motion picture camera use. After exposure, the element may be processed in any suitable color negative process including, for example, the KODAK FLEXICOLOR™; (C-41) process as described in British Journal of Photography Annual, 1988, pp 196–198. The element may be a color reversal film element, which may be processed in KODAK process E-6. The details of typical color elements sensitometric procedures and chemical processes useful in the present invention are described in *Research Disclosure* Item 38957 (pages 624–639) and the references cited therein and are herein incorporated by reference.

The method of measuring the propensity for the overcoat surface of a multilayer element to develop electrostatic charges when dissimilar surfaces contact the overcoat surface is identified as the impact electrification method, which is described in detail in U.S. Pat. No. 3,501,653 to Bailey. In this method, a flat surface of a probe made of a reference material such a stainless steel is contacted under pressure to and immediately separated from the surface of the overcoat of the element, which has been conditioned at a selected relative humidity. The electrostatic charge generated by this impact and separation is accurately measured, recorded, and converted to units of microcoulombs per square meter. These measurements are useful in systematically adjusting the electrostatic charging propensity of the overcoat surface by making changes in the overcoat layer composition and in particular changes in the structure and relative amounts of fluoroalkyl surfactant added to the overcoat layer coating solution. Other reference materials in addition to stainless steel may be used for these measurements when evaluating the charging properties of elements that are expected to contact many types of dissimilar surfaces during manufacture and in exposure and processing equipment.

The present invention discloses a novel overcoat composition that is modified and improved over prior overcoat compositions which are known to have favorable static charging properties in manufacturing and in exposure and processing equipment. When impact electrification measurements of an element with the modified overcoat composition have similar values to those obtained with the prior element, it is to be expected that the element with a modified overcoat composition will have similarly favorable static charging properties. The examples below show the performance of a prior composition, the composition of the invention, and a comparative composition.

EXAMPLE 1

Multilayer silver halide photosensitive materials were prepared consisting of the layers outlined below. Component laydowns are provided in units of g/m$^2$. (Bisvinylsulfonyl) methane hardener at 1.80% of total gelatin weight. Antifoggants (including 4-hydroxy-6-methyl-1,3,3a,7-tetraazaindene), surfactants, coating aids, coupler solvents, emulsion addenda, sequestrants, lubricants, matte beads and tinting dyes were added to the appropriate layers as is common in the art.

The overcoat layer compositions were prepared by combining an aqueous solution of gelatin, polymer matte beads, dispersed lubricant, coating aid surfactants, and other suitable addenda, and adding a solution of the fluorosurfactant. The resulting compositions were coated simultaneously with a UV-absorbing layer and two yellow dye forming layers, using conventional multilayer coating methods, over a previously coated interlayer and three magenta dye forming layers (coated simultaneously). The magenta dye forming layers had been coated over a previously-coated interlayer and four cyan dye forming layers and antihalation layer. The resulting color negative film was evaluated for its electrostatic charging properties.

Example 1a Comparative

Layer 1 (Protective Overcoat Layer): poly (methylmethacrylate-methacrylic acid) copolymer at 0.108 as matte beads, poly(methylmethacrylate) matte beads at 0.005, gelatin at 0.888, bis-(2-ethyl hexyl) sulfosuccinate, sodium salt at 0.022, and nonylphenoxy-poly(glycidol)(10) at 0.030, polydimethylsiloxane at 0.039.

Layer 2 (UV Filter Layer): silver bromide Lippmann emulsion at 0.215, UV-1 and UV-2 both at 0.108 and gelatin at 0.70.

Layer 3 (Fast Yellow Layer): a blend of two blue sensitized silver iodobromide emulsion: a 3-D emulsion. 1.21 μm diameter (BSD-1), 9.7 mole % I at 1.055, YC-1 at 0.317, IR-1 at 0.065, B-1 at 0.011, MHR at 0.009, and gelatin at 1.259.

Layer 4 (Slow Yellow Layer): a blend of three blue (BSD-1+BSD-2) sensitized tabular silver iodobromide emulsions (i) 2.41×0.140 μm, 2.0 mole % 1 at 0.417, (ii) 1.02×0.137 μm, 2.0 mole % I at 0.141, (iii) 0.62×0.111 μm, 2.6 mole % I at 0.525, yellow dye forming coupler YC-1 at 0.858, IR-1 at 0.040, IR-6 at 0.022, B-1 at 0.009 and gelatin at 1.975.

Layer 5 (Top Interlayer): OxDS-1 at 0.182, ADA-1 at 0.030, and gelatin at 1.000.

Layer 6 (Fast Magenta Layer): a green sensitized (with a mixture of GSD-1 and GSD-2) silver iodobromide tabular emulsions (2.90×0.13 μm, 3.7 mole % iodide) at 1.240, magenta dye forming coupler MC-1 at 0.095, masking Coupler MM-1 at 0.022, IR-7 at 0.003, IR-2 at 0.011, OxDS-1 at 0.013 and gelatin at 1.461.

Layer 7 (Mid Magenta Layer): a blend of two green sensitized (both with a mixture of GSD-1 and GSD-2) silver iodobromide tabular emulsions: (i) 2.46x0.13 μm, 3.7 mole % iodide at 0.534 and (ii) 1.45x.0.13 μm, 3.7 mole % iodide at 0.370, magenta dye forming coupler MC-1 at 0.077, Masking Coupler MM-1 at 0.110, IR-8 at 0.015, OxDS-1 at 0.011 and gelatin at 1.394.

Layer 8 (Slow magenta layer): a blend of two green sensitized (both with a mixture of GSD-1 and GSD-2) silver iodobromide tabular emulsions: (i) 1.17x0.12 μm, 4.5 mole % iodide at 0.208 and (ii) 0.62x.0.111 μm, 2.6 mole % iodide at 0.584, magenta dye forming coupler MC-1 at 0.293, Masking Coupler MM-1 at 0.090, IR-8 at 0.020, OxDS-1 at 0.011 and gelatin at 1.400.

Layer 9 (Bottom Interlayer): OxDS-1 at 0.075 and gelatin at 0.0538.

Layer 10 (Ultra Cyan layer): a red-sensitized sensitized (with a mixture of RSD-3, RSD-4, and RSD-5) silver iodobromide tabular emulsion (3.87x0.13 μm, 3.7 mole % I) at 1.180, cyan dye-forming coupler CC-2 at 0.175, IR-4 at 0.060, IR-3 at 0.001, OxDS-1 at 0.014 and gelatin at 1.225.

Layer 11 (Fast Cyan Layer): a red-sensitized sensitized (all with a mixture of RSD-3, RSD-4, and RSD-5) silver iodobromide tabular emulsion (2.41x0.13 μm, 3.7 mole % I) at 1.286, cyan dye-forming coupler CC-1 at 0.163, IR-5 at 0.054, bleach accelerator releasing coupler B-1 at 0.008 and gelatin at 1.100.

Layer 12 (Mid Cyan Layer): a red-sensitized sensitized (with a mixture of RSD-3 and RSD-4) silver iodobromide tabular emulsion (1.44x0.13 μm, 3.7 mole % I) at 0.572, cyan dye-forming coupler CC-1 at 0.265, CC-2 at 0.103, IR-5 at 0.043, masking coupler CM-1 at 0.022 and gelatin at 1.000.

Layer 13 (Slow Cyan Layer): a blend of two red sensitized (both with a mixture of RSD-3 and RSD-4) silver iodobromide emulsions: (i) a large sized iodobromide tabular grain emulsion (0.81x0.11 μm), 4.5 mole % I) at 0.400, (ii) a smaller iodobromide tabular emulsion (.0.62x0.0.111 μm, 4.1 mole % iodide) at 0.175, cyan dye-forming coupler CC-1 at 0.248, CC-2 at 0.236, IR-6 at 0.032, bleach accelerator releasing coupler B-1 at 0.086, OxDS-2 at 0.006, and gelatin at 1.650.

Layer 14 (Antihalation layer): Black Colloidal Silver at 0.150, UV-1 and UV-2 both at 0.075, ADA-1 at 0.043, OxDS-1 at 0.097, and gelatin at 1.610.

These layers were coated on cellulose triacetate. The back of the support was coated with a layer containing a conductive polymer, a quaternary ammonium acrylic copolymer.

Example 1b Comparative

Layer 1: add fluorosurfactant FC-1 at 0.006

Example 1c Invention

Layer 1: add FC-2 at 0.006.

Example 1d Invention

Layer 1: add FC-3 at 0.015.

Fluorosurfactant FC-1 was obtained from 3M Company and FC-2, and FC-3 were obtained from Ciba Specialty Chemicals Corporation.

UV-1

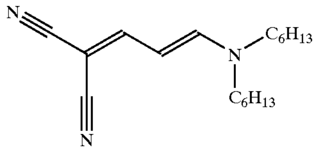

UV-2

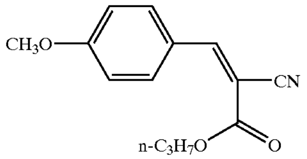

VC-1

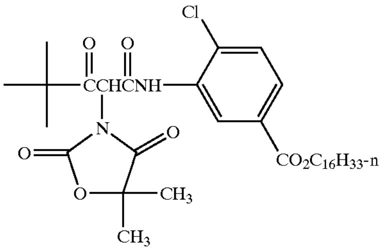

YFD-1

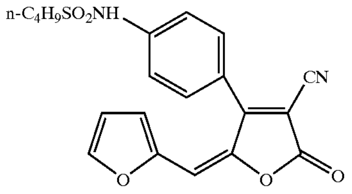

-continued
MC-1
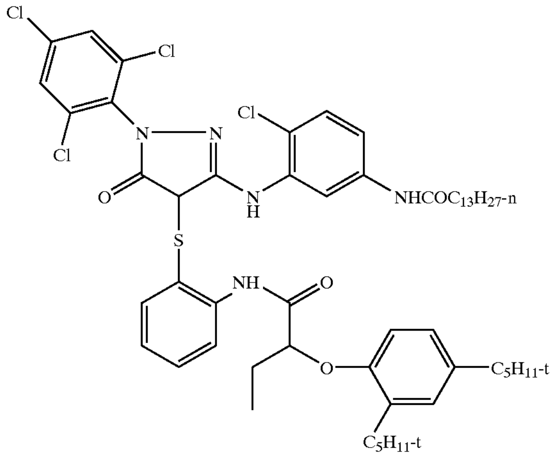
MM-1
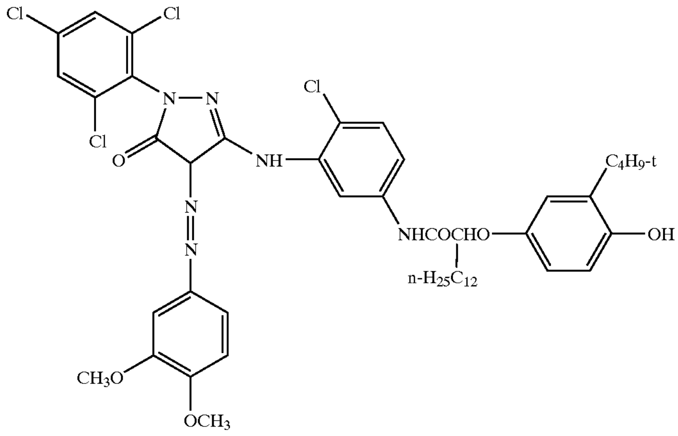
CC-1
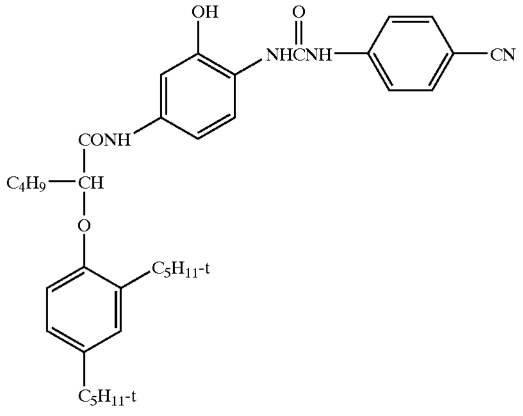

-continued
CM-1
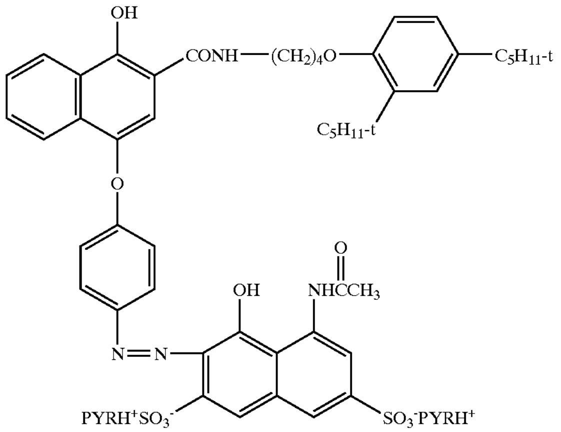
CC-2
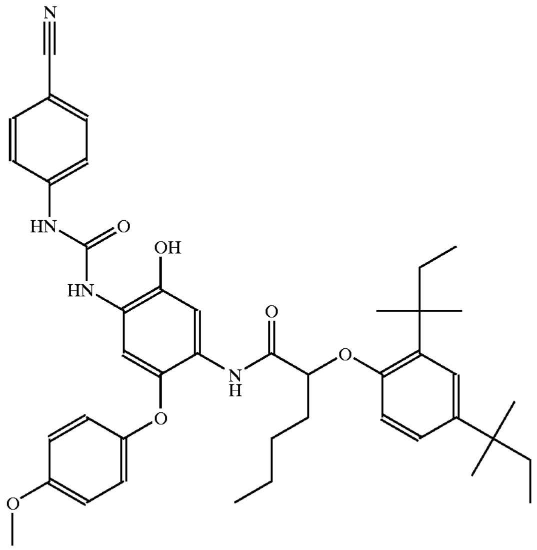
B-1
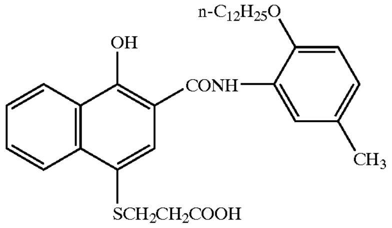
OxDS-1
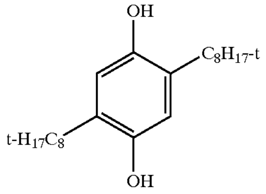
OxDS-2
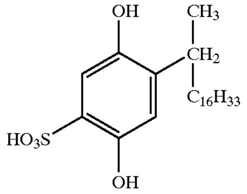

-continued
IR-1
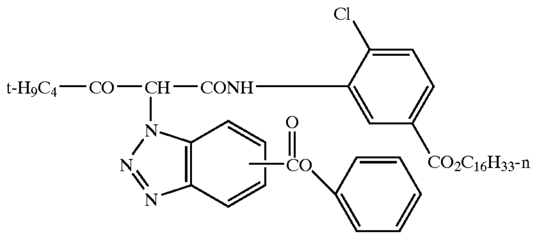
IR-2
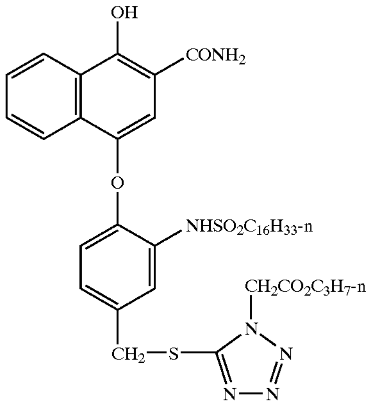
IR-3
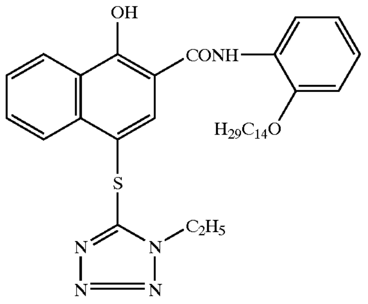
IR-4
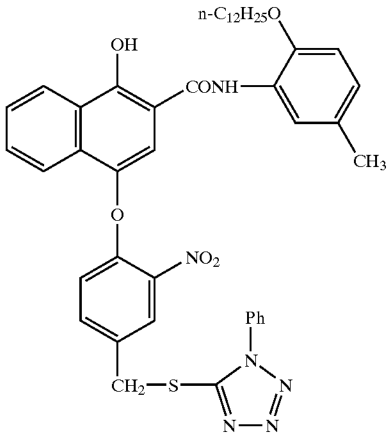

-continued
IR-5
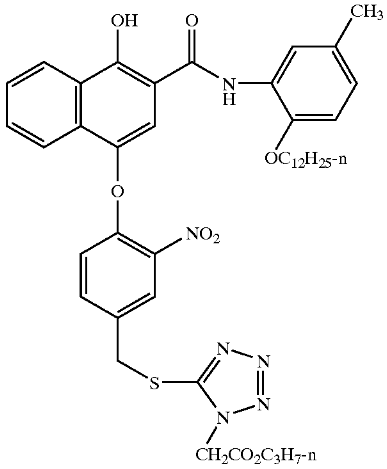
IR-6
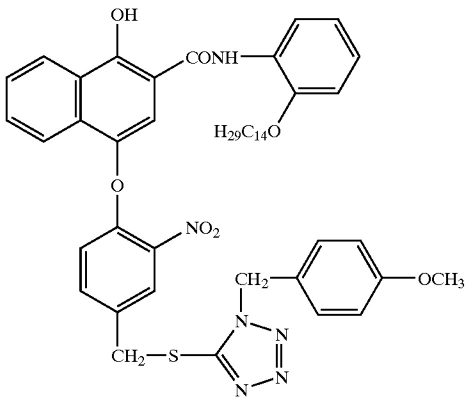
IR-7
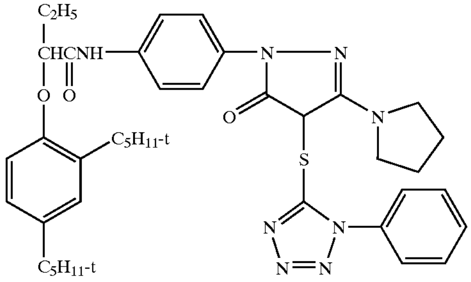
BSD-1
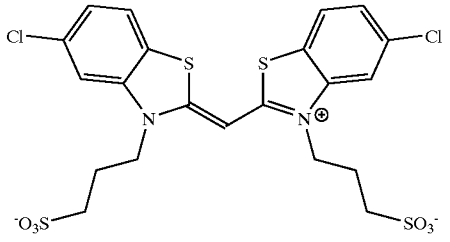

-continued
RSD-1
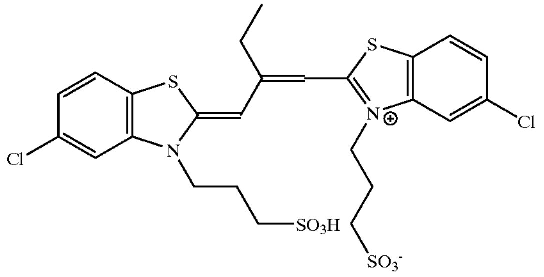
RSD-2
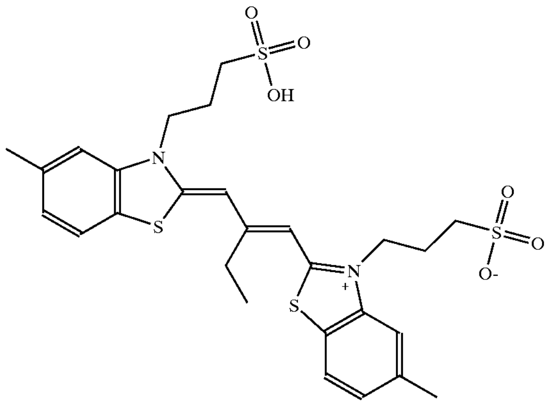
GSD-1
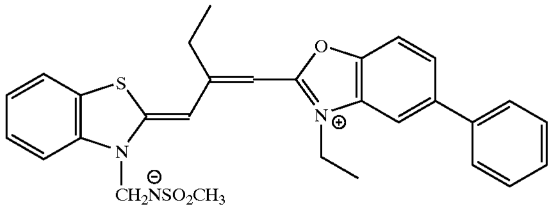
GSD-2
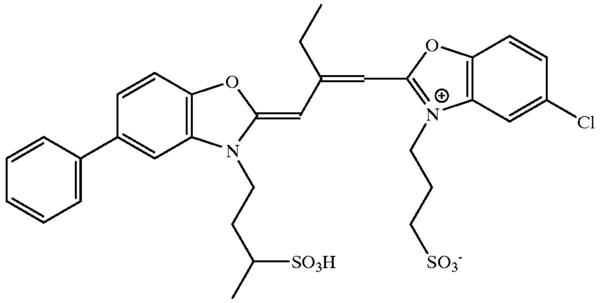
BSD-2
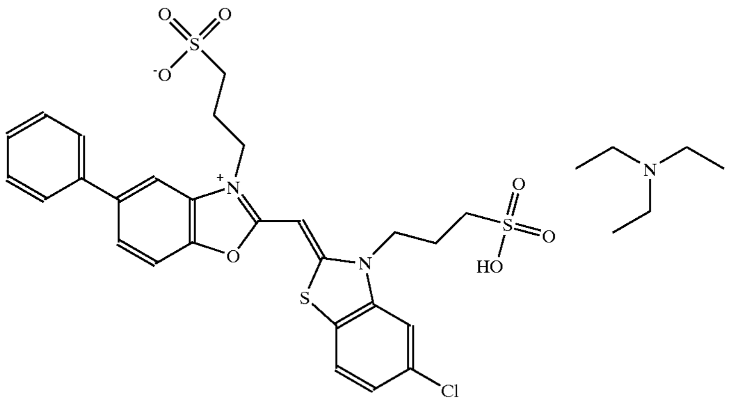

-continued
DYE-1
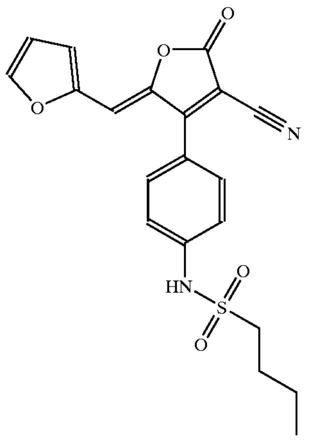
RSD-3
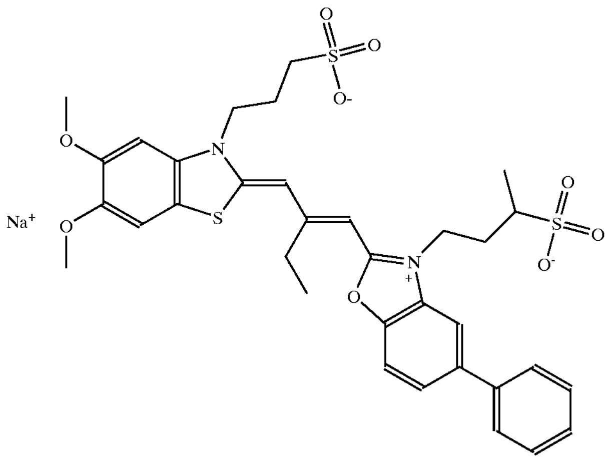
RSD-4
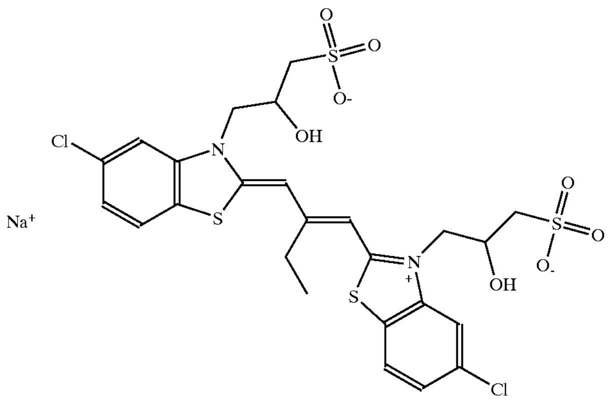

-continued
RSD-5
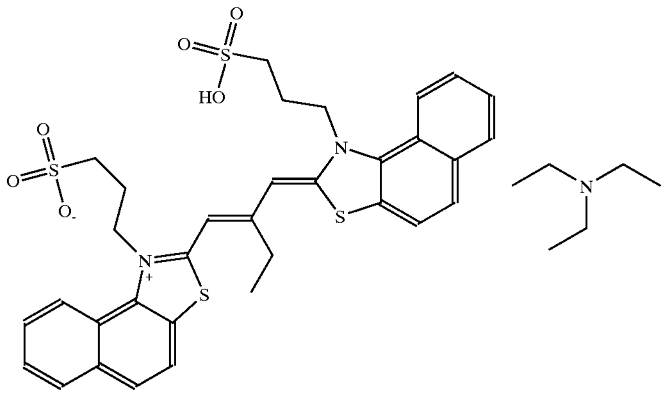
ADA-1
(1:2 by weight in
N,N-dibutyllauramide)
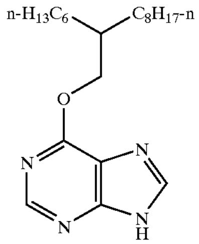
Dye-2
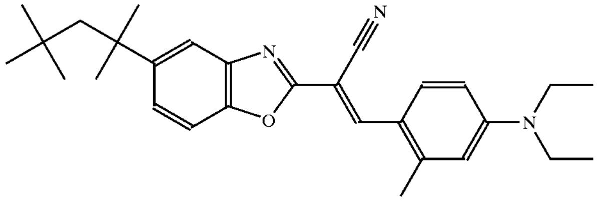
IR-8
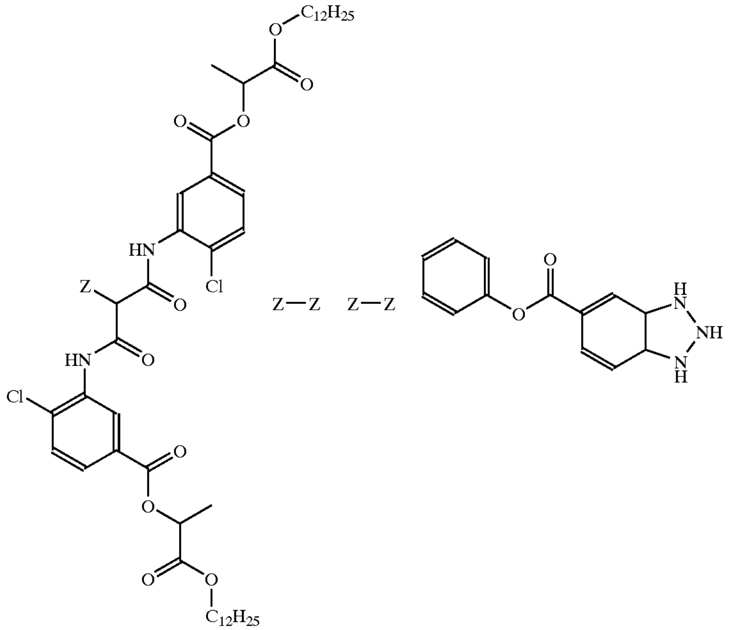

-continued

MHR 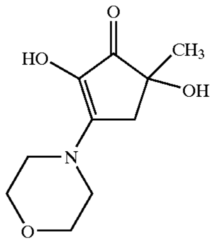

FC-1 (FC-135)
$C_8F_{17}SO_2NHCH_2CH_2CH_2NMe_3^+$
FC-2
$R_f$—$CH_2CH_2$—$SCH_2CH(OH)CH_2NMe_3^+$
$R_f$ comprising at least 95% $C_6F_{13}$
FC-3
Rf—$CH_2CH_2$—S—$CH_2CH_2C(=O)NH$—$C(CH_3)_2CH_2SO_3$—Na+
$R_f$ comprising at least 95% $C_6F_{13}$ Film samples were conditioned to a relative humidity of 50% or 20% and subjected to the impact electrification test. The test was conducted for the impact charging of metal (stainless steel) to emulsion side of the film samples (M/E) and for back side of the film to emulsion side (B/E). The averages of duplicate test results are shown in Table 1 in units of microcoloumbs per square meter of surface. The use of coating compositions employing FC-1 through FC-3 resulted in a reduction of the (M/E) impact charge below 30 compared to over 50 in the sample 1a containing no fluorinated surfactant. The change in the back-to-emulsion impact charge values (B/E) was from values of +7 or greater to moderately negative values. The comparison film with FC-1 was known to exhibit favorable electrostatic charging properties during manufacturing and in exposure and processing equipment. The comparison film containing no fluorinated surfactant exhibited unfavorable static marking in its image-forming layers as a result of normal handling and transport during typical exposure and processing methods.

TABLE 1

| FS | Coverage ($mg/m^2$) | Comment | Impact charge (M/E) @50% RH | Impact charge (B/E) @50% RH | Impact charge (M/E) @20% RH | Impact charge (B/E) @20% RH |
|---|---|---|---|---|---|---|
| none | 0 | Comp | 55 | 7 | 53 | 9 |
| FC-1 | 5.8 | Comp | 22 | −7 | 20 | −6 |
| FC-3 | 15.12 | Inv | 28 | −3 | 38 | 0 |
| FC-2 | 5.8 | Inv | 21 | −6 | 19 | −6 |
| FC-2 | 3.9 | Inv | 25 | −3 | 19 | −3 |

EXAMPLE 2

Multilayer coatings were prepared according to example 1, exposed to a simulated daylight source at an approximate color temperature of 5500K through a stepped neutral density tablet for 0.01 seconds. The samples were processed in the KODAK FLEXICOLOR™; (C-41) process as described in British Journal of Photography Annual, 1988, pp 196–198. Relative light sensitivity was determined by comparing the exposure necessary to obtain a density +0.15 units above Dmin. The relative sensitivity is given by subtracting the exposure amount from unity and calculating the ratio of sensitivity to the comparison sample. The examples were repeated from 5 to 7 times. The average of these measurements is given in Table 2.

TABLE 2

| Ingredient | FC-1 | FC-2 | FC-3 |
|---|---|---|---|
| relative blue sensitivity | 100 | 105 | 103 |

The results of Example 2 demonstrate that the Inventive coating compositions of the Invention containing FC-2 and FC-3 provide an enhanced blue sensitivity of the multilayer photographic element compared to the coating compositions containing the prior art compound FC-1.

The coating compositions of the invention, when employed as the overcoat of a multilayer photographic material, provide protection from static discharge during the manufacture and use of the material and surprisingly, a higher relative speed of the blue sensitive record.

What is claimed is:

1. A photographic element comprising:

a) a support, b) at least one image-forming layer; and c) an outermost overcoat layer comprising an aqueous solution of:

two or more surfactants, where only one of the surfactants is fluorinated;

a hydrophilic binder;

matte beads; and a lubricating agent;

wherein one of the surfactants is represented by the following Formula (I):

$$R_f\text{—}CH_2CH_2\text{—S-(A)-D} \qquad (I)$$

wherein $R_f$ is —$(CF_2)_nCF_3$, when n represents the number of $CF_2$ groups and is 3 or 5 in at least 60% of the $R_f$ groups present, and in the remainder of $R_f$ groups n is an odd number from 7 to 13;

A is a divalent linking group that includes substituted alkylene or alkylene (N-alkylene)amide; and D is an ionic group; and wherein said composition is used in forming an overcoat layer in a photographic element that contains at least one distinct non-image-forming layer between the overcoat layer and any image-forming layer, wherein the non-image forming layer between the overcoat layer and any image-forming layer contains a UV-absorbing compound.

2. The photographic element of claim 1 wherein n represents the number of $CF_2$ groups and is 3 or 5 in at least 90% of the $R_f$ groups present, and in the remainder of $R_f$ groups n is an odd number up to 13.

3. The photographic element of claim 1 wherein the group D in the surfactant represented by Formula I is cationic or anionic.

4. The photographic element of claim 1 containing at least one surfactant, not represented by Formula I, selected from the group consisting of alkyl or alkyl aryl sulfonates, alkyl aryl polyether sulfates or sulfonates, and alkyl sulfosuccinate esters.

5. The photographic element of claim 4 further containing another surfactant, not represented by Formula I, selected from the group consisting of nonionic alkylphenoxy polyether compounds.

6. The photographic element of claim 1 containing at least one surfactant, not represented by Formula I, selected from the group consisting of bis-(2-ethyl hexyl) sulfosuccinate, sodium salt, and nonylphenoxy-poly(glycidol)(10).

7. The photographic element of claim 1 wherein D is $—SO_3M$ or $—NR_1R_2R_3$ X, where $R_1$, $R_2$, and $R_3$ are independently selected from alkyl or substituted alkyl groups, M is a monovalent ion and X is a halide ion.

8. The photographic element of claim 7 wherein M is Na+ or K+ and X is Cl−.

9. The photographic element of claim 1 wherein the surfactant represented by Formula I is present in a ratio of 1:15 to 1:2 by weight based on the dry weight of the other surfactant or surfactants.

10. The photographic element of claim 1 wherein the lubricant is a poly(dimethyl siloxane).

11. The photographic element of claim 1 comprising two types of matte beads.

12. The photographic element of claim 11 wherein one type of matte bead is a copolymer of methylmethacrylate and methacrylic acid.

13. The photographic element of claim 12 wherein one type of matte bead is a polymer of methylmethacrylate.

14. The photographic element of claim 1 wherein the element is a silver halide photographic element.

15. The photographic element of claim 1 wherein the binder is gelatin.

16. The photographic element of claim 1 wherein the surfactant represented in Formula (I) is present in an amount between 1 and 25 milligrams per square meter.

17. The photographic element of claim 1 wherein the surfactant represented in Formula (I) is present in an amount in between 2 and 15 milligrams per square meter.

18. The photographic element of claim 1 wherein n in the remainder of the $R_f$ groups is an odd number from 7 to 11.

19. A photographic element comprising:

a) a support, b) at least one image-forming layer; and c) an outermost overcoat layer comprising an aqueous solution of:

two or more surfactants, where only one of the surfactants is fluorinated;

a hydrophilic binder;

matte beads; and a lubricating agent;

wherein one of the surfactants is represented by the following Formula (I):

$$R_f—CH_2CH_2—S\text{-}(A)\text{-}D \qquad (I)$$

wherein $R_f$ is $—(CF_2)_nCF_3$, when n represents the number of $CF_2$ groups and is 3 or 5 in at least 60% of the $R_f$ groups present, and in the remainder of $R_f$ groups n is an odd number from 7 to 13;

A is a divalent linking group that includes substituted alkylene or alkylene (N-alkylene)amide; and D is a cationic or anionic group;

wherein said composition is used in forming an overcoat layer in a photographic element that contains at least one distinct non-image-forming layer containing a UV-absorbing compound and disposed between the overcoat layer and any image-forming layer.

20. A photographic element comprising:

a) a support, b) at least one image-forming layer; and c) an outermost overcoat layer comprising an aqueous solution of:

two or more surfactants, where only one of the surfactants is fluorinated;

a hydrophilic binder;

matte beads; and a lubricating agent;

wherein one of the surfactants is represented by the following Formula (I):

$$R_f—CH_2CH_2—S\text{-}(A)\text{-}D \qquad (I)$$

wherein $R_f$ is $—(CF_2)_nCF_3$, when n represents the number of $CF_2$ groups and is 3 or 5 in at least 90% of the $R_f$ groups present, and in the remainder of $R_f$ groups n is an odd number up to 13;

A is a divalent linking group that includes substituted alkylene or alkylene (N-alkylene)amide; and D is a cationic or anionic group; and wherein said composition is used in forming an overcoat layer in a photographic element that contains at least one distinct non-image-forming layer.

21. A method of providing control of static charge for a photographic element, the method comprising the steps of providing a photographic element, coating its outermost layer with a fluorinated surfactant coating composition and drying said coating, said coating composition comprising:

i) a mixture of two or more surfactants, where only one of the surfactants is fluorinated;

ii) a hydrophilic binder;

iii) matte beads; and iv) a lubricating agent;

wherein one of the surfactants is represented by the following Formula (I):

$$R_f—CH_2CH_2—S\text{-}(A)\text{-}D \qquad (I)$$

where $R_f$ is $—(CF_2)_nCF_3$, where n represents the number of $CF_2$ groups and is 3 or in at least 40% of the $R_f$ groups present, and in the remainder of $R_f$ groups n is an odd number from 7 to 13;

A is a divalent linking group that includes substituted alkylene or alkylene (N-alkylene)amide; and D is an anionic group or a cationic group; and wherein the photographic element contains at least one distinct non-image-forming layer between the overcoat layer and any image-forming layer, said non-image-forming layer containing a UV-absorbing compound.

22. A photographic element comprising:

a) a support, b) at least one image-forming layer; and c) an outermost overcoat layer comprising an aqueous solution of:

two or more surfactants, where only one of the surfactants is fluorinated;

a hydrophilic binder;

matte beads; and a lubricating agent;

wherein one of the surfactants is represented by the following Formula (I):

$$R_f—CH_2CH_2—S\text{-}(A)\text{-}D \quad (I)$$

wherein $R_f$ is $—(CF_2)_nCF_3$,

A is a divalent linking group that includes substituted alkylene or alkylene (N-alkylene)amide; and D is an ionic group; and wherein said composition is used in forming an overcoat layer in a photographic element that contains at least one distinct non-image-forming layer between the overcoat layer and any image-forming layer, wherein n represents the numb of $CF_2$ groups and is 3 or 5 in at least 90% of the $R_f$ groups present, and in the remainder of $R_f$ groups n is an odd number up to 13.

23. The photographic element of claim 22 wherein th group D in the surfactant represented by Formula I is cationic or anionic.

24. The photographic element of claim 22 containing at least one surfactant, not represented by Formula I, selected from the group consisting of alkyl or alkyl aryl sulfonates, alkyl aryl polyether sulfates or sulfonates, and alkyl sulfosuccinate esters.

25. The photographic element of claim 24 further containing another surfactant, not represented by Formula I, selected from the group consisting of nonionic alkylphenoxy polyether compounds.

26. The photographic element of claim 22 containing at least one surfactant, not represented by Formula I, selected from the group consisting of bis-(2-ethyl hexyl) sulfosuccinate, sodium salt, and nonylphenoxy-poly (glycidol)(10).

27. The photographic element of claim wherein D is $—SO_3$ M or $—NR_1R_2R_3$ X, where $R_1$, $R_2$, and $R_3$ are independently selected from alkyl or substituted alkyl groups, M is a monovalent ion and X is a halide ion.

28. The photographic element of claim 27 wherein the non-image-forming layer between the overcoat layer and any image-forming layer contains a UV-absorbing compound.

* * * * *

UNITED STATES PATENT AND TRADEMARK OFFICE

CERTIFICATE OF CORRECTION

PATENT NO. : 6,875,563 B2
DATED : April 5, 2005
INVENTOR(S) : Michael W. Orem et al.

It is certified that error appears in the above-identified patent and that said Letters Patent is hereby corrected as shown below:

Column 36,
Line 20, after "claim" insert -- 22 --.

Signed and Sealed this

Thirty-first Day of January, 2006

JON W. DUDAS
*Director of the United States Patent and Trademark Office*